United States Patent [19]
Gainer

[11] 3,853,993
[45] Dec. 10, 1974

[54] PROCESS FOR INCREASING OXYGEN DIFFUSIVITY AND METHOD FOR TREATING ATHEROSCLEROSIS

[75] Inventor: John L. Gainer, Charlottesville, Va.

[73] Assignee: The University of Virginia, Charlottesville, Va.

[22] Filed: June 28, 1973

[21] Appl. No.: 374,801

Related U.S. Application Data

[62] Division of Ser. No. 356,110, May 1, 1973.

[52] U.S. Cl. .............................................. 424/180
[51] Int. Cl. ......................... A01n 9/00, A01n 9/28
[58] Field of Search...................... 424/180; 260/413

Primary Examiner—Elbert L. Roberts
Attorney, Agent, or Firm—Oblon, Fisher, Spivak, McClelland & Maier

[57] ABSTRACT

Diffusivity of oxygen in aqueous solutions has been increased by the introduction of a water soluble carotenoid into the solutions. Carotenoids have been found to be useful for increasing the diffusivity of oxygen in the blood, and hence are useful for the reduction of local hypoxia, which is believed to be one of the factors in development of atherosclerosis. The administration of these materials has resulted in reducing the incidence of atherosclerosis in mammals.

15 Claims, No Drawings

3,853,993

PROCESS FOR INCREASING OXYGEN DIFFUSIVITY AND METHOD FOR TREATING ATHEROSCLEROSIS

This is a division of application Ser. No. 356,110, filed May 1, 1973.

BACKGROUND OF THE INVENTION

1. Field of the Invention

This invention relates to a method of treating atherosclerosis. Further, this invention relates to a method of increasing the diffusivity of oxygen in blood and other aqueous solutions, whereby when used in blood can reduce the phenomena of local hypoxia at the blood tissue interface of the blood.

Description of the Prior Art

It has long been suspected that deprivation of oxygen in the blood-tissue interface of the blood vessels is a factor in the initiation of atherosclerosis. However, the causes of this hypoxia is still unknown, and heretofore it has not been clearly understood whether atherosclerosis is caused by the hypoxia, or is a cause of the hypoxia. It has been shown that the diffusivity of oxygen, glucose and carbon dioxide through blood plasma will decrease with increased protein concentrations. For instance, an increase in the concentration of albumin in the blood plasma from 2.0 to 5.0 gm/100 ml at 37°C will cause almost a 50% decrease in diffusivity of oxygen. This means that increases in the concentrations of albumin and globulins, as well as cholesterol in the blood, a result that occurs naturally as a function of the aging process, may have physiological consequences.

It was postulated by Hueper, Arch. Path 39, 51, 117, 187 (1945) that an interference with the oxidative metabolism of tissue comprising the blood vessel walls causes vascular injury leading to edema or atherosclerosis. This injury increases the wall permeability and allows inbibition of plasmatic matter which further impairs the oxidation and nutrition of its cellular elements.

Studies of the effects of prolonged hypoxia of chloresterol fed rabbits were reported by Kjeldsend, et a., J. Atheroscler Res 8, 835 (1968) and others which seem to indicate a pronounced worsening of edema, medial thickening and degenerative vascular lesions in mammals existing in lowered oxygen atmospheres. These studies indicate the occurrence of an increased permeability of the endothelium and intima to chloresterol, triglycerides and proteins as well as impairment of the capacity for oxidation.

Oxygen supply to the luminal tissue of the larger arteries is critical for many reasons. For example, the vascularization of the aorta in humans is such that the intima and the inner one-third of the media are dependent on the blood flowing through the vessel for their supply of nutrients. Only the outer two thirds of the media and the serosa are supplied by the vasa vasorum. Using an average respiration rate for aortic tissue, it can be calculated that the avascular portion of the inner arterial wall is very close to the limiting penetration distance for oxygen. This suggests that the inner media is constantly on the verge of hypoxia, and therefore might be expected to be very sensitive to alterations in oxygen tension and intimal thickness.

The result of hypoxia at the vascular wall seems to be a vicious cycle. Local changes can result in reduced transport of metabolites and can cause local hypoxia. This increases membrane permeability to extracellular lipids and inhibits the ability of the cells to disperse lipidic substances as micellar fat. That is, hypoxia can inhibit further protein and phospholipid syntheses, which are necessary for dispersion of globular fat to micellar fat. Furthermore, cholesterol reduces the emsulifying capacity of the phospholipids. Thus if the increased oxygen demands are not satisfied, the lipid micelles are changed to globular fat that cannot be mobilized by the cell. This results in lipid-laden cells or atherocytes and accelerates local hypoxia. This cycle appears to be intensified in the hypertensive or aging patient. Since diabetics almost always also have atherosclerosis, it is interesting to note that elevated serum glucose levels have also been found to result in lowered oxygen diffusivity. For example, a serum glucose level of 250 mg % (lower diabetic level) will result in a 30% decrease in oxygen diffusivity when compared to the normal state (100 mg%).

The present inventors previously reported in Nature pages 390–391 April 1971 the postulate that increases in the plasma proteins might be responsible for the onset of hypoxia at the vascular wall. Since atherosclerosis is more prevalent in the aged, the variation of protein and cholesterol concentration with age was observed. It was found that the oxygen diffusivity in plasma tends to decrease as the normal human gets older.

It is now contemplated, therefore, that if local hypoxia can be reduced, the instance of atherosclerosis may well be likewise reduced. No method, however, is presently known for decreasing local hypoxia, which would seem to involve either increasing the oxygen saturation of the blood or increasing the diffusivity of oxygen in the blood plasma. Increasing the oxygen saturation with hyperbaric oxygen would seem to be impractical and no method of increasing the diffusivity of oxygen through any polymer solution, human blood plasma or otherwise, however, has heretofore been reported. In general, it is known that diffusion of oxygen in a polymer solution is dependent upon the concentration of the polymers (plasma proteins in the blood). One way of increasing diffusivity of oxygen in the blood is therefore to decrease the concentration of plasma proteins. However, no practical technique has been advanced to effect significant reductions. A wide variety of different pharmaceutical formulations have been suggested for reducing and/or controlling triglycerides, cholesterol, lipoproteins, etc., such as by formation of sterol complexes which thus prevents their absorption into the blood, see U.S. Pat. No. 3,627,879, however, these preparations are not entirely satisfactory since they fail to treat the problem of cholesterol buildup in the blood plasma as a natural function of aging.

SUMMARY OF THE INVENTION

Accordingly, one object of this invention is to provide a method for treating atherosclerosis and closely related states such as edema.

Another object of this invention is to provide a method for reducing the phenomena of local hypoxia at the blood-tissue interface of the blood vessel walls.

Still another object of this invention is to provide a method of enhancing the diffusivity of oxygen in an aqueous solution, and in particular blood plasma solution.

These and other objects have been attained by the discovery that the carotenoid compounds, such as crocetin and crocin, will act in blood plasma to increase oxygen diffusivity. The increased oxygen diffusivity can then act so as to reduce local hypoxia. Accordingly, these objects have been attained by the discovery that the administration of crocetin to a mammal will tend to markedly reduce the incidence of atherosclerosis, and its attendant damage to blood vessels. In particular, it has been found that when crocetin is administered to a mammal, that a significant lowering of serum cholesterol levels occurs.

DETAILED DESCRIPTION OF THE PREFERRED EMBODIMENTS

The present invention is predicated on the discovery that the water soluble carotenoids display the unexpected property of increasing the diffusivity of oxygen in an aqueous medium. This is particularly surprising in view of the apparent fact that no other material has been reported which will increase oxygen diffusivity to the same degree.

The carotenoids useful for this purpose are those of the form

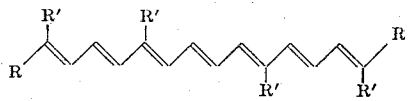

wherein each R may represent a hydrophilic group and each R' represents hydrogen or methyl. Suitable hydrophilic groups include the carboxyl groups or the ester groups of the form COOR'' wherein R'' represents a soluble sugar group, such as $C_{12}H_{21}O_{10}$, an alkanol group, such as $-CH_2-OH$, $-CH_2-CH_2-OH$, or $-CH_2-CH_2-CH_2-OH$, or a carboxy substituted lower alkyl, such as $-CH_2-COOH$, $-CH_2-CH_2-COOH$ or $-CH_2-CH_2-CH_2-COOH$, or each R and R' may represent a lower alkanol group, such as $-CH_2-OH$, $-CH_2-CH_2-OH$, $-CH_2-CH_2-CH_2-OH$, a hydroxyl group, or an amine group of the form $-NH$ or $-NR'''$ wherein R''' is a lower alkyl, lower alkanol or carboxy substituted lower alkyl, or a carboxy substituted lower alkyl, such as $-CH_2-CH_2-OH$, $-CH_2-OH$, $-CH_2-CH_2-CH_2-OH$.

Most prefered are crocetin, also known as 8,8'-diapo-8,8'-carotenoic acid, which at present has no other known practical application, and crocin, also known as digentiobiosyl 8,8'-diapo-8,8'-carotenedioate.

When a water soluble carotenoid such as crocetin, or crocin is admixed into an aqueous solution in amounts of from $10^{-6}$ to $10^2$ parts by weight, that the diffusivity of oxygen within the solution will increase by 10 to 100%.

The second aspect of the present invention is the realization that the introduction of the water soluble carotenoid into the blood stream of a mammal will significantly reduce the incidence of hypoxia at the tissue blood interface. Coupled with the knowledge that hypoxia seems to be related to the occurance of the condition of atherosclerosis, the treatment of the soluble carotenoids to mammals has now been found to reduce the incidence of said condition.

In blood plasma taken in vitro from Dutch-belted rabbits wherein the quantity of crocetin per quantity of blood plasma was in a ratio of 1/1000, diffusivity was found to increase by 60 – 70%.

For the treatment of atherosclerosis, or to reduce serum cholesterol levels, the water soluble carotenoids can be administered to the mammal either orally in the form of a capsule or tablet, or intravenously or intramuscularly. The effective dosage of the crocetin, of course, will probably depend upon the severity of the condition, the stage and the individual characteristics of each mammal being treated. It is expected, however, that the water soluble carotenoids, and particularly crocetin or crocin, may be administered in a dosage ranging from about 0.005 mg to 100 mg active ingredient per kg of body weight per week and preferably from 0.01 to 0.1 mg per kg of body weight per week.

The water soluble carotenoids may be used in combination with suitable dietary suppliments, such as vitamins, choline, salts of glycerophosphoric acid and inositol, or candicidin, which are known to be effective in reducing serum cholesterol levels.

While it is not completely clear, it is believed that the effect of the water soluble carotenoids in the blood stream of the mammal, is to increase the diffusivity of oxygen in the blood stream. This tends to reduce the occurrance of local hypoxia at the blood-tissue interface of the blood vessels, which seems to occur as the quantity of cholesterol, phospholipids and triglycerides in the blood increase, usually as a natural function of aging. The occurrance of local hypoxia would otherwise cause the vascular walls to increase in permeability which permits the transport of those substances into the vascular wall. The introduction of relatively large quantities of cholesterol, phospholipids and triglycerides into the vascular walls, causes the walls to lose their elasticity and to develop visible lesions thereon. The reduction of local hypoxia seems to prevent the vascular walls from becoming permeable so that entrance of these substances is avoided.

The effectiveness of the water soluble carotenoids has been indicated by tests with large mammals, i.e. those weighing at least about 1 – 2 kg. For example, tests conducted on Dutch-belted rabbits demonstrated the effectiveness of the crocetin including the reduction in serum cholesterol levels.

Having now generally described the invention, a further understanding can be attained by reference to certain specific examples which are provided herein for purposes of illustration only and are not to be construed as limiting of the invention unless otherwise specified.

EXAMPLE 1

Method for crocetin experiment:

In order to investigate the in vivo effect of crocetin on the prevention of atherosclerosis, we performed the following experiment on three groups of six Dutch-belted rabbits.

All groups were fed a regular rabbit chow diet blended with 1% cholesterol. One group was a control, one received intramuscular injections every day of 2.75 ml of a 30% rabbit albumin-saline solution, and the third group received the same amount of a rabbit albumin-saline solution which had been saturated with crocetin. In addition, a monthly intravenous injection of a saturated crocetin-saline solution was administered to the third group. Thus, the dosage rate of crocetin for these experiments was approximately 0.01 mg per kg of body weight. The rabbits were housed in individual cages at the vivarium of the University of Virginia Hospital and the average temperature of the room was about 70°F. All rabbits were offered water and their respective diets ad libitum. Injections were administered in the thigh muscle of the hind leg to allow gradual absorption of the protein. Duration of treatment was 4 months.

After that time, the chest of the anesthetized rabbit was opened and the pericardial membrane enclosing the heart was cut. About 60 cc. of isotonic saline were then injected slowly into the left heart, and the right heart was pierced to allow the blood to flow out. In this manner the aorta was cleared of most of the blood cells. Following this, the left heart was similarly perfused with diluted formalin in saline to begin the tissue fixation process.

Following death, the heart and entire descending aorta were removed and placed in 10% formalin-in-saline for final fixation. Fixation was allowed for at least 24 hours before the tissue was examined.

Following fixation, two 1-centimeter lengths of lower thoracic aorta (above the upper abdominal bifurcation) were removed from each sample for viewing by a light microscope. The remainder of the aorta was opened longitudinally and prepared for gross evaluation of lipid deposits by staining with Sudan IV lipid dye.

After staining the aortae were divided into three sections for viewing: the aortic arch (from the heart to the first small branches, the intercostal arteries), the thoracic section (extending from the first intercostal arteries to just above the abdominal branches), and the abdominal section (extending from just above the first abdominal branch to the iliac bifurcation where the aorta divides and enters the two hind legs). The percentage of intima affected by lipid deposit was appraised and are shown in the following Table I.

TABLE I

| Dutch-belted rabbits on a 1% cholesterol diet for 4 months | | | | | |
|---|---|---|---|---|---|
| Plasma albumin level | Crocetin added | Average Thickness of aorta (mm) | Average Lesion Coverage; % of area in aorta: | | |
| | | | Arch | Thoracic | Abdominal |
| Normal | No | 0.265 | 22.6 | 9.6 | 19.6 |
| Elevated by approximately 1 g% | No | 0.348 | 41.0 | 20.0 | 20.6 |
| Elevated by approximately 1 g% | Yes | 0.181 | 15.0 | 2.2 | 4.2 |

Average thickness of aortae of rabbits on regular rabbit-chow diet was 0.171 mm.

One of the initially removed segments of the lower thoracic region of each aorta was stained, mounted in paraffin and microtomed. Light microscope slides were then made, each slide containing four cross-sections of each aorta. The maximum wall thicknesses for each mounted sample was then measured using a calibrated light microscope, with a viewing screen. Wall thicknesses measured included media plus intima plus lesion, it any, are reported in Table I.

Serum cholesterol values were also determined by standard methods and are shown in Table II.

TABLE II

| Plasma Albumin Level | Serum Cholesterol Levels mg/100 ml |
|---|---|
| Normal | 1400 |
| Elevated by approximately 1 g% | 1400 |
| Elevated by approximately 1 g% plus saturated with crocetin | 800 |

It was also observed that the animals treated with the water soluble carotenoids had a thicker fur, grew larger and were generally significantly healthier.

EXAMPLE 2

Enhanced oxygen diffusivity:

The diffusivity of oxygen in blood plasma and in protein solutions were measured. Diffusion coefficients for the system studied were determined by a microinterferometric method adapted from methods employed for studying concentration profiles around growing crystals, as reported in *Ambrose*, J. Sci. Instr. 25, 134 (1948) and *Nishijima, et al* J. Polymer Sci 19, 337 (1956) and Li, et al, I and EC Fund 7, 433 (1968).

The results of those tests showed that at 23°C, the addition of 1 part of crocetin per 1000 parts (weight) of water, increased the diffusivity of oxygen by 80 ±5% and the addition of 1 part crocin per 1,000 parts (weight) of water increased the diffusivity of oxygen by 59 ±5%.

Interestingly, when other members of the caroteid genus were tested, even those having a close chemical structure, it was found that they did not function in the same advantageous manner as crocetin. For instance, based on the chemical structure alone, it was speculated that crocetin-semi-aldehyde which is only a difficultly soluble cartenoid should also be useful in the treatment of atherosclerosis and for increasing diffusivity, however, it was found that it had no significant effect.

Although the primary aim of this invention is the perfection of a technique for the treatment of atherosclerosis, this invention is also concerned with the more basic discovery of the unique property of the water soluble carotenoids, particularly crocetin and crocin to increase diffusivity of oxygen in aqueous solutions. The discovery of this property has important applications in a wide range of commercial and industrial applications which require high diffusivity rates of oxygen, such as in the application of dyes to a fiber, or in the treatment of metals, and in the wet spinning of synthetic fibers, the incorporation of plasticizers in plastics and rubber, chemical oxidation-reduction reactions, fermentataion reactions and sewage treatment.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method for the treatment of atherosclerosis in a mammal which comprises administering to said mammal an effective dose of a water soluble carotenoid.

2. The method of claim 1 wherein said water soluble carotenoid has the formula

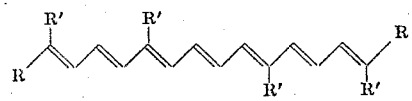

wherein each R is a hydrophilic group and wherein each R' is hydrogen or methyl.

3. The method of claim 2 wherein said water soluble carotenoid is crocin.

4. The method of claim 2 wherein said water soluble carotenoid is crocetin.

5. The method of claim 1 wherein said water soluble carotenoid is administered in a dose rate of from 0.005 mg to 100 mg active ingredient per kg of body weight per week.

6. A method for the treatment of atherosclerosis in a mammal which comprises administering to said mammal an amount of a water soluble carotenoid sufficient to increase the diffusivity of oxygen in the blood of said mammal and thereby reduce local hypoxia at the blood tissue interface of the blood vessels.

7. The method of claim 6 wherein said water soluble carotenoid has the formula

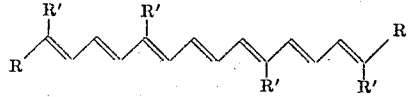

wherein each R is a hydrophilic group and wherein each R' is hydrogen or methyl.

8. The method of claim 6 wherein said water soluble carotenoid is crocin.

9. The method of claim 6 wherein said water soluble carotenoid is crocetin.

10. The method of claim 6 wherein said water soluble carotenoid is administered in a dose rate of from 0.005 mg to 100 mg active ingredient per kg of body weight per week.

11. A method for the treatment of atherosclerosis in a mammal which comprises administering a water soluble cartenoid in a dose rate of from 0.005 mg to 100 mg active ingredient per kg of body weight per week to said mammal, wherein said water soluble cartenoid has the formula:

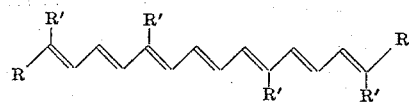

wherein each R' is hydrogen or methyl and each R is a hydrophilic group selected from the group consisting of carboxyl groups or ester groups of the form COOR'', wherein R'' represents a soluble sugar group, an alkanol group, carboxy substituted lower alkyl, hydroxyl or amine.

12. A method for reducing the quantity of cholesterol, phospholipids and triglycerides in the blood serum of a mammal, which comprises administering a water soluble cartenoid in a dose rate of from 0.005 mg to 100 mg active ingredient per kilogram of body weight per week, to said mammal, wherein said water soluble cartenoid has the formula

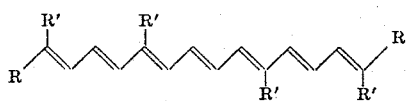

wherein each R is a hydrophilic group and wherein each R' is hydrogen or methyl.

13. The method of claim 12, wherein said water soluble cartenoid is crocin.

14. The method of claim 12, wherein said water-soluble cartenoid is crocetin.

15. The method of claim 12, wherein each R' is hydrogen or methyl and each R is a hydrophilic group selected from the group consisting of carboxyl groups or ester groups of the form COOR'', wherein R'' represents a soluble sugar group, an alkanol group, carboxy substituted lower alkyl, hydroxyl or amine.

* * * * *